US012699197B2

(12) United States Patent
Zhang et al.

(10) Patent No.: US 12,699,197 B2
(45) Date of Patent: Aug. 4, 2026

(54) ROCK FACIES IDENTIFICATION METHOD BASED ON SEISMIC ATTRIBUTE CLASSIFICATION USING A MACHINE LEARNING NETWORK

(71) Applicant: SAUDI ARABIAN OIL COMPANY, Dhahran (SA)

(72) Inventors: Si-Hai Zhang, Dhahran (SA); Xuekai Sun, Beijing (CN); Ammar Y. Balilah, Dhahran (SA); Yijun Hu, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 539 days.

(21) Appl. No.: 18/259,969

(22) PCT Filed: Mar. 25, 2022

(86) PCT No.: PCT/CN2022/082934

§ 371 (c)(1),
(2) Date: Jun. 29, 2023

(87) PCT Pub. No.: WO2023/178632

PCT Pub. Date: Sep. 28, 2023

(65) Prior Publication Data

US 2024/0377547 A1      Nov. 14, 2024

(51) Int. Cl.
*G01V 1/30*        (2006.01)
*G01V 1/36*        (2006.01)
*G01V 1/50*        (2006.01)

(52) U.S. Cl.
CPC .............. *G01V 1/302* (2013.01); *G01V 1/307* (2013.01); *G01V 1/364* (2013.01); *G01V 1/50* (2013.01);

(Continued)

(58) Field of Classification Search
CPC ........ G01V 1/302; G01V 1/307; G01V 1/364; G01V 1/50; G01V 2210/51;

(Continued)

(56) References Cited

U.S. PATENT DOCUMENTS 10,067,253 B2     9/2018   Lowell et al.
10,139,507 B2    11/2018   Wahrmund et al.

(Continued)

OTHER PUBLICATIONS

G. Partyka et al; "Interpretational applications of spectral decomposition in reservoir characterization". The Leading Edge vol. 18, No. 3, pp. 353-360; Mar. 1999 (5 pages).

(Continued)

*Primary Examiner* — Mi'schita' Henson
(74) *Attorney, Agent, or Firm* — Osha Bergman Watanabe & Burton LLP

(57)        ABSTRACT

Methods and systems for determining a rock facies map are disclosed. The method includes obtaining a three-dimensional (3D) seismic image and a plurality of well logs, and identifying a horizon and determining a set of bandlimited 3D seismic images. The method further includes determining a set of mono-frequency maps by applying spectral decomposition to the 3D seismic image and determining a seismic attribute map based on the set of mono-frequency maps and a machine learning network. The method still further includes identifying a set of rock facies based, at least in part, on the plurality of well logs, determining a transformation function that maps a subset of rock facies to values of the seismic attribute map, and determining the rock facies map based on the seismic attribute map and the transformation function.

12 Claims, 9 Drawing Sheets

(52) U.S. Cl.
CPC .... *G01V 2210/51* (2013.01); *G01V 2210/643*
(2013.01)

(58) Field of Classification Search
CPC ............. G01V 2210/643; G01V 1/345; G01V
2210/16; G01V 1/46; G06N 20/00
See application file for complete search history.

(56) References Cited

U.S. PATENT DOCUMENTS

| | | | |
|---|---|---|---|
| 10,249,080 B2 | 4/2019 | Griffith | |
| 10,884,147 B2 | 1/2021 | Thorne et al. | |
| 11,846,748 B2 * | 12/2023 | Jiang ........................ | G01V 1/01 |
| 2014/0278117 A1 | 9/2014 | Dobin et al. | |
| 2019/0041534 A1 * | 2/2019 | Bandura ................ | G01V 1/307 |
| 2019/0227186 A1 * | 7/2019 | Gubair ................... | G01V 1/301 |
| 2021/0270130 A1 * | 9/2021 | Lu ........................... | E21B 44/00 |
| 2022/0082729 A1 * | 3/2022 | Algheryafi ............. | G01V 20/00 |
| 2026/0036050 A1 * | 2/2026 | AlTayyar .............. | E21B 49/088 |
| 2026/0079273 A1 * | 3/2026 | He ......................... | G01V 1/303 |

OTHER PUBLICATIONS

C. Puryear et al: "Constrained least-squares spectral analysis: Application to seismic data"; Geophysics, vol. 77, No. 5, pp. V143-V167; Sep.-Oct. 2012 (25 pages).
D. Tzikas et al; "The Variational Approximation for Bayesian Inference". IEEE Signal Processing Magazine, vol. 25, No. 6, pp. 131-146, Nov. 2008 (16 pages).
International Search Report issued in corresponding International Application No. PCT/CN2022/082934, mailed on Nov. 29, 2022 (4 pages).
Written Opinion issued in corresponding International Application No. PCT/CN2022/082934, mailed on Nov. 29, 2022 (5 pages).
A.Nag et al; "Application of Seismic Facies Classification, Spectral Decomposition and Seismic Attributes to characterize deep-water depositional facies in Oligocene sequence of KG Basin, India", 11th Biennial International Conference & Exposition, 2015, http://bharatpetroresources.in/pdf/paperPublish/SPG-2015-ID133ApplicationofSeismicFaciesClassification-6-bdb866.pdf (6 pages).
M. Sharma et al; "Seismic Facies Classification and RGB Blending as Tools For Prospect Generation: Case Study"; Geohorizons, pp. 6-12; Jan. 2017 (7 pages).
V. Ha; "Application of Spectral Inversion to Enhance Seismic Resolution in Nam Con Son Basin, Offshore Vietnam"; https://uh-ir.tdl.org/bitstream/handle/10657/1674/HA-THESIS-2014.pdf?sequence=1&isAllowed=y; Dec. 2014 (73 pages).

* cited by examiner

200

112

202

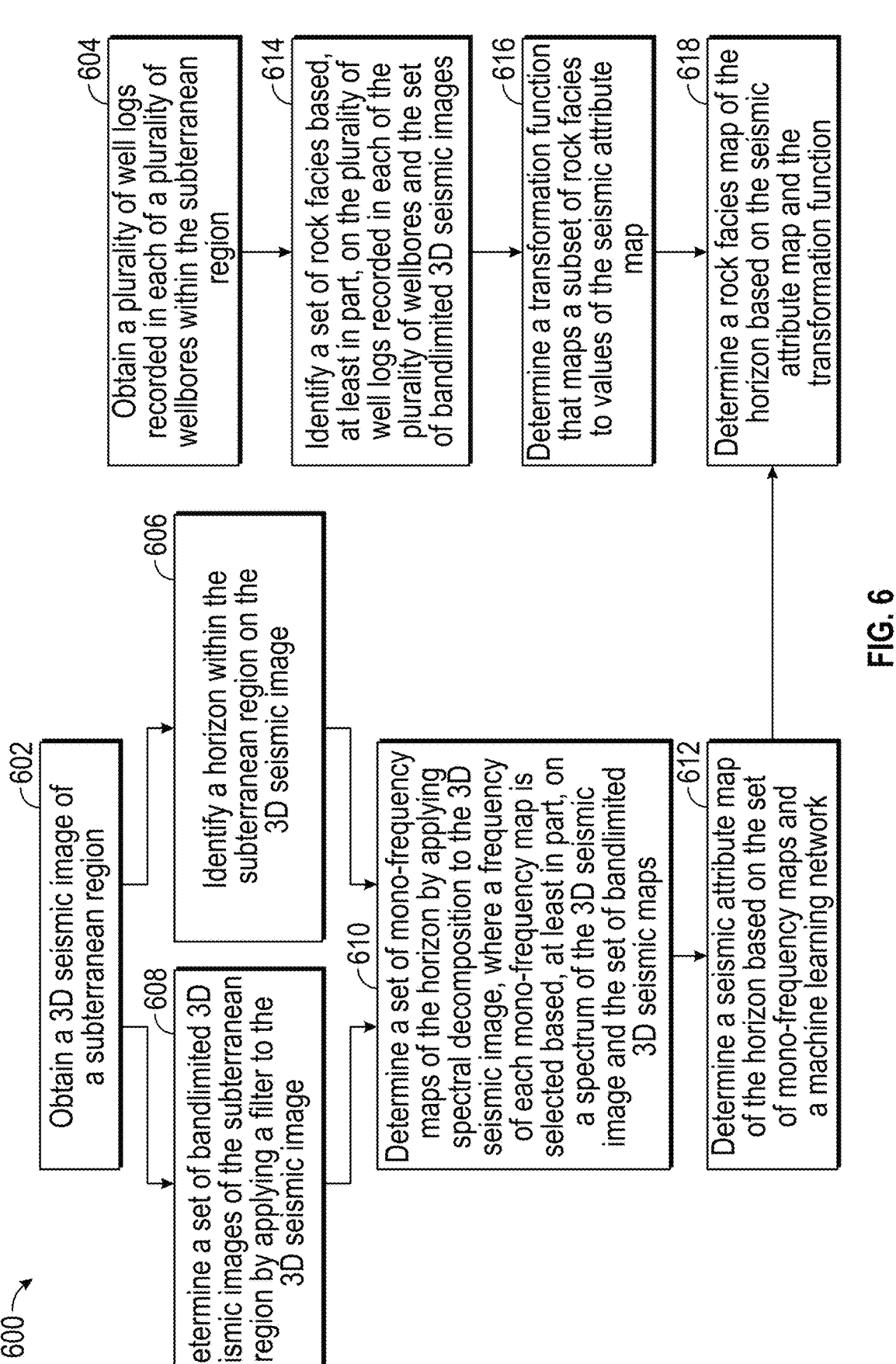

FIG. 6

604 — Obtain a plurality of well logs recorded in each of a plurality of wellbores within the subterranean region 614 — Identify a set of rock facies based, at least in part, on the plurality of well logs recorded in each of the plurality of wellbores and the set of bandlimited 3D seismic images 616 — Determine a transformation function that maps a subset of rock facies to values of the seismic attribute map 618 — Determine a rock facies map of the horizon based on the seismic attribute map and the transformation function 602 — Obtain a 3D seismic image of a subterranean region 606 — Identify a horizon within the subterranean region on the 3D seismic image 608 — Determine a set of bandlimited 3D seismic images of the subterranean region by applying a filter to the 3D seismic image 610 — Determine a set of mono-frequency maps of the horizon by applying spectral decomposition to the 3D seismic image, where a frequency of each mono-frequency map is selected based, at least in part, on a spectrum of the 3D seismic image and the set of bandlimited 3D seismic maps 612 — Determine a seismic attribute map of the horizon based on the set of mono-frequency maps and a machine learning network

600

700
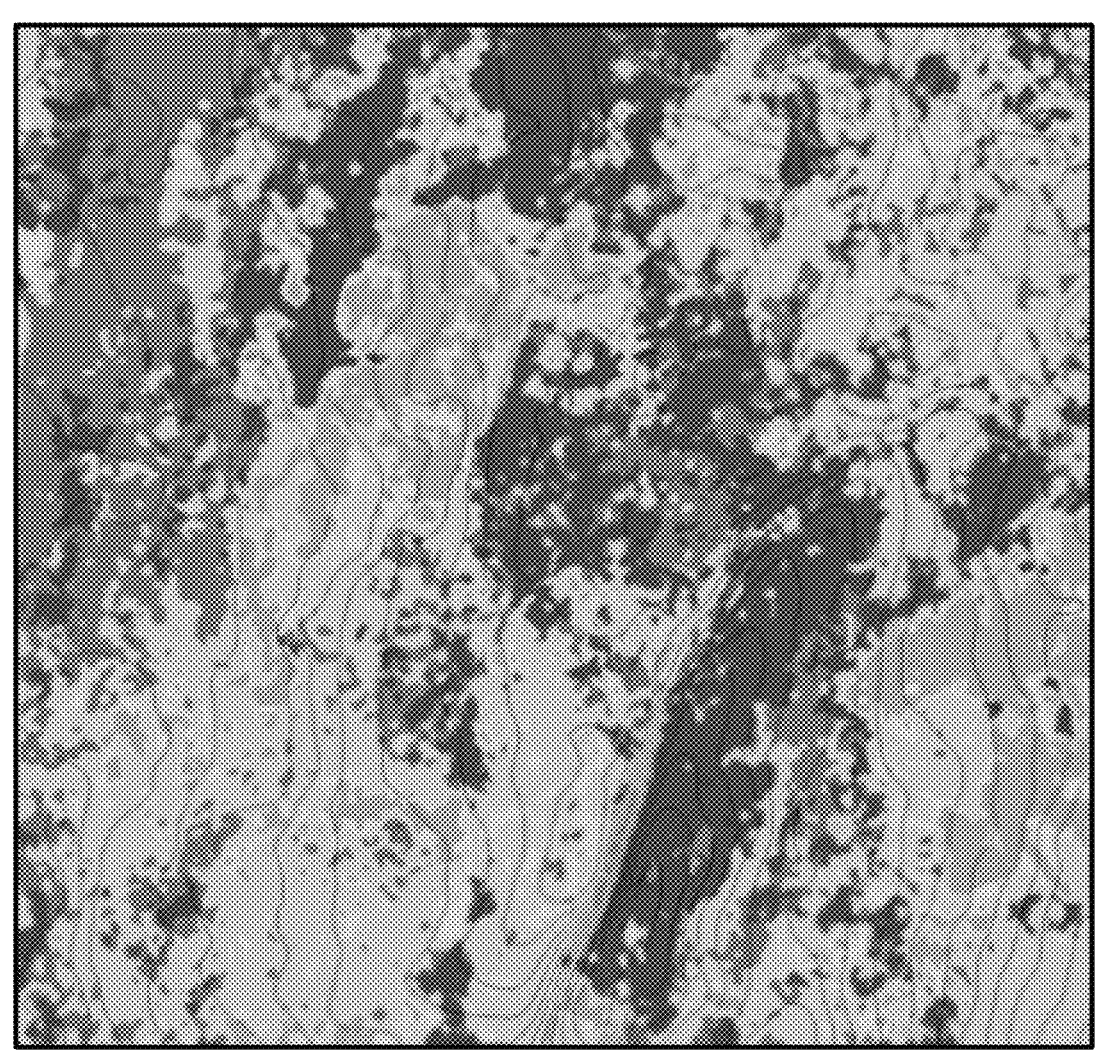
702
FIG. 7

ROCK FACIES IDENTIFICATION METHOD BASED ON SEISMIC ATTRIBUTE CLASSIFICATION USING A MACHINE LEARNING NETWORK

BACKGROUND

Well logs may be used to identify facies and petrophysical properties of rock. Rock facies are defined for a body of rock using specified observable characteristics and the changes that may occur in those characteristics. Examples of rock facies include rock color, grain shape, and rock type. Petrophysical properties are defined as physical and chemical properties of rock and the interaction of rock with fluids. Examples of petrophysical properties include porosity, permeability, and saturation. Specific rock facies and petrophysical properties may be identified as being characteristic of the productive portions of a hydrocarbon reservoir. Following identification, a wellbore may be drilled to recover hydrocarbons from the hydrocarbon reservoir.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method of determining a rock facies map. The method includes obtaining a three-dimensional (3D) seismic image of a subterranean region and a plurality of well logs recorded in each of a plurality of wellbores within the subterranean region, and identifying a horizon within the subterranean region on the 3D seismic image and determining a set of bandlimited 3D seismic images of the subterranean region by applying a filter to the 3D seismic image. The method further includes determining a set of mono-frequency maps of the horizon by applying spectral decomposition to the 3D seismic image, wherein a frequency of each mono-frequency map is selected based, at least in part, on a spectrum of the 3D seismic image and the set of bandlimited 3D seismic images and determining a seismic attribute map of the horizon based, at least in part, on the set of mono-frequency maps and a machine learning network. The method still further includes identifying a set of rock facies based, at least in part, on the plurality of well logs recorded in each of the plurality of wellbores and the set of bandlimited 3D seismic images, determining a transformation function that maps a subset of rock facies to values of the seismic attribute map, and determining the rock facies map of the horizon based, at least in part, on the seismic attribute map and the transformation function.

In general, in one aspect, embodiments relate to a non-transitory computer readable medium storing instructions executable by a computer processor. The instructions include functionality for receiving a three-dimensional (3D) seismic image of a subterranean region and a plurality of well logs recorded in each of a plurality of wellbores within the subterranean region, and identifying a horizon within the subterranean region on the 3D seismic image and determining a set of bandlimited 3D seismic images of the subterranean region by applying a filter to the 3D seismic image. The instructions further include determining a set of mono-frequency maps of the horizon by applying spectral decomposition to the 3D seismic image, wherein a frequency of each mono-frequency map is selected based, at least in part, on a spectrum of the 3D seismic image and the set of bandlimited 3D seismic images and determining a seismic attribute map of the horizon based, at least in part, on the set of mono-frequency maps and a machine learning network. The instructions still further include identifying a set of rock facies based, at least in part, on the plurality of well logs recorded in each of the plurality of wellbores and the set of bandlimited 3D seismic images, determining a transformation function that maps a subset of rock facies to values of the seismic attribute map, and determining the rock facies map of the horizon based, at least in part, on the seismic attribute map and the transformation function.

In general, in one aspect, embodiments relate to a system including a seismic acquisition system, a well logging system, and a computer system configured to receive a three-dimensional (3D) seismic image of a subterranean region and a plurality of well logs recorded in each of a plurality of wellbores within the subterranean region, and identify a horizon within the subterranean region on the 3D seismic image and determine a set of bandlimited 3D seismic images of the subterranean region by applying a filter to the 3D seismic image. The computer system is further configured to determine a set of mono-frequency maps of the horizon by applying spectral decomposition to the 3D seismic image, wherein a frequency of each mono-frequency map is selected based, at least in part, on a spectrum of the 3D seismic image and the set of bandlimited 3D seismic images and determine a seismic attribute map of the horizon based, at least in part, on the set of mono-frequency maps and a machine learning network. The computer system is still further configured to identify a set of rock facies based, at least in part, on the plurality of well logs recorded in each of the plurality of wellbores and the set of bandlimited 3D seismic images, determine a transformation function that maps a subset of rock facies to values of the seismic attribute map, and determine the rock facies map of the horizon based, at least in part, on the seismic attribute map and the transformation function.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIG. 6 shows a flowchart in accordance with one or more embodiments.

FIG. 7 shows a rock facies map in accordance with one or more embodiments.

DETAILED DESCRIPTION

Figure 1:
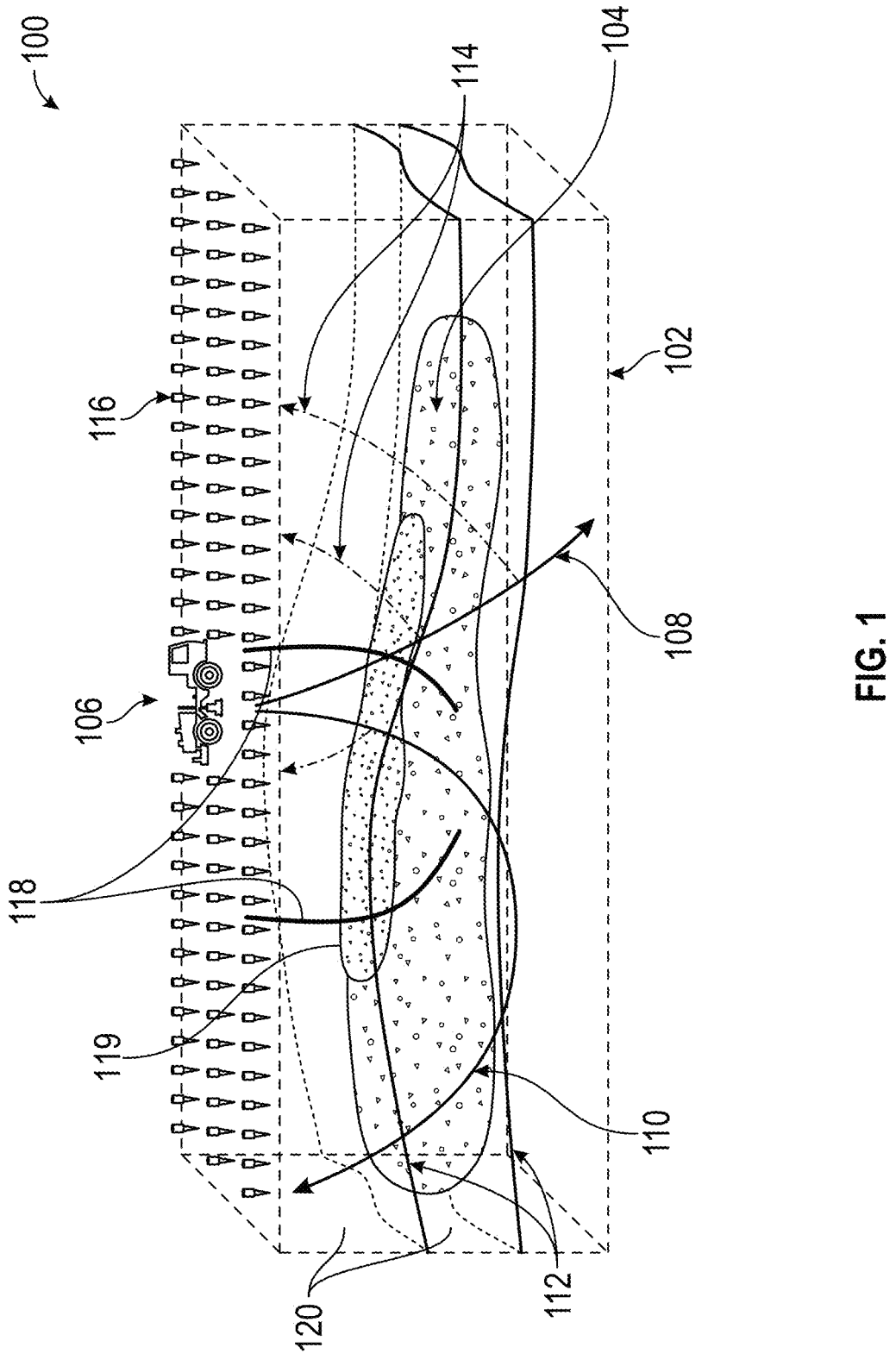
FIG. 1 depicts a seismic survey.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-9, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a rock facies" includes reference to one or more of such rock facies.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

FIG. 1 shows a seismic survey (100) of a subterranean region (102) using a seismic acquisition system. The subterranean region (102) contains a gas deposit (120) within a hydrocarbon reservoir (104) that is being recovered by wellbores (118). The gas deposit may be methane, ethane, or another hydrocarbon gas. The seismic acquisition system uses a seismic source (106) to generate radiated seismic waves (108). The radiated seismic waves (108) may return to the surface as refracted seismic waves (110) or reflected seismic waves (114), where reflected seismic waves (114) occur due to subterranean boundaries (112) between rock (120). At the surface, refracted seismic waves (110) and reflected seismic waves (114) may be detected by seismic receivers (116).

The refracted seismic waves (110) and reflected seismic waves (114) generated by a single activation of the seismic source (106) are recorded by a seismic receiver (116) as a time-series representing the amplitude of ground-motion at a sequence of discrete times. This time-series may be denoted a seismic "trace". A seismic source (106) is positioned at a location denoted $(x_s, y_s)$ where x and y represent orthogonal axes on the surface of the Earth above the subterranean region (102). The seismic receivers (116) are positioned at a plurality of seismic receiver locations denoted $(x_r, y_r)$. Thus, the refracted seismic waves (110) and reflected seismic waves (114) generated by a single activation of the seismic source (106) may be represented as five-dimensional seismic data by $(x_s, y_s, x_r, y_r, t)$ where t delimits the time sample at which the amplitude of ground-motion was measured by a seismic receiver (116).

Figure 2A:
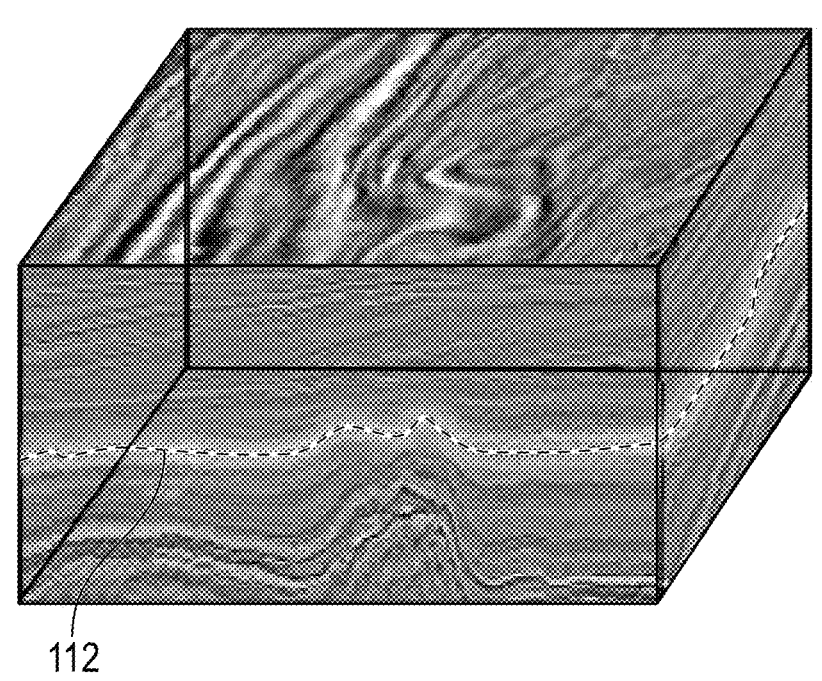
FIG. 2A shows a three-dimensional seismic image in accordance with one or more embodiments.

Processing of the seismic data may be performed by a number of methods known to a person of ordinary skill in the art without departing from the scope of the invention. For example, the seismic data may be time migrated seismic data or depth migrated seismic data. The seismic data may also be further processed to correct for source (106) and receiver (108) location geometry and to attenuate noise while leaving the amplitude of the seismic signal undistorted. The seismic data may be reduced to a three-dimensional (3D) seismic image of the subterranean region (102) that delineates subterranean boundaries (112) as large or bright reflection amplitudes. FIG. 2A shows one embodiment of a seismic image (200) where white represents large or bright reflection amplitudes in time. Hereinafter, a 3D seismic image (200) will also be denoted a "seismic image".

A subterranean boundary (112) is often called a "horizon" by a person of ordinary skill in the art, particularly when referring to the manifestation of the subterranean boundary (112) in the seismic image (200). Use of the term horizon does not imply that the horizon is either flat or planar. Hereinafter, horizon is used to encompass both the subterranean boundary (112) in the subterranean region (102) and the manifestation of the subterranean boundary (112) in the seismic image (200). Further hereinafter, the terms "horizon" and "subterranean boundary" will be used interchangeably.

Figure 2B:
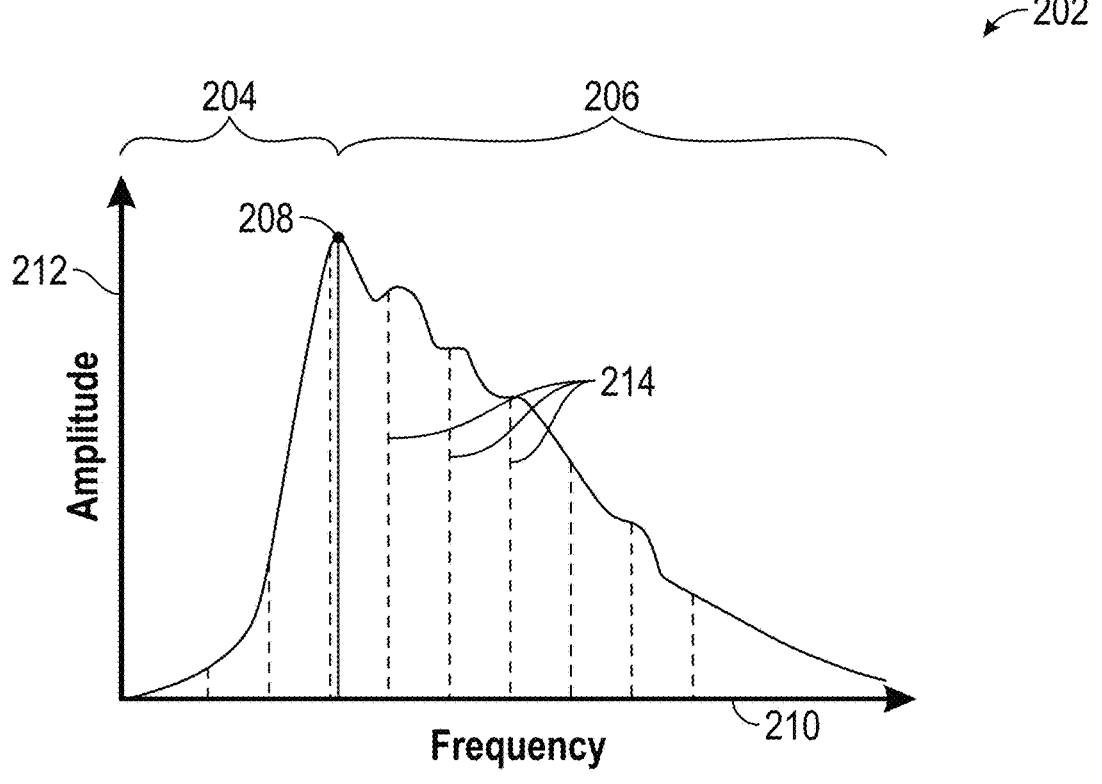
FIG. 2B shows a spectrum of a seismic image in accordance with one or more embodiments.

In addition to a seismic image (200) manifesting subterranean boundaries (112) in a subterranean region (102), a seismic image (200) may also contain seismic attributes, that may be, without limitation, a travel time, an impedance, an amplitude, a frequency, and a coherence. A person of ordinary skill in the art will appreciate, however, that hundreds of seismic attributes may be determined from seismic data. For example, FIG. 2B shows a spectrum (202) of a seismic image (200) at a horizon (112). The spectrum (202) is displayed as a function of frequency as indicated on the abscissa (210) and amplitude as indicated on the ordinate (212). A spectrum of the entire seismic image (200) may be different from the spectrum (202) of a seismic image (200) at a horizon (112).

A spectrum (202) may be divided into a low frequency portion (204) and a high frequency portion (206). In some embodiments, the low frequencies (204) and high frequencies (206) are separated by peak frequency (208). The seismic image (200) may be filtered using a bandpass filter first designed to pass low frequencies (204) to determine a low frequency bandlimited seismic image. The seismic image (200) may also be filtered using a bandpass filter designed to pass high frequencies (206) to determine a high frequency bandlimited seismic image. Other filters include a high-pass filter, a low-pass filter, a band-stop filter, a notch filter, and a Fourier transform. A low-pass filtered seismic image may exhibit large or bright amplitudes in certain areas or for particular horizons of the seismic image (200). Alternatively, a high-pass filtered seismic image may exhibit large or bright amplitudes in certain areas or for particular horizons of the seismic image (200). Hereinafter, any filter applied to a seismic image (200) to determine a bandlimited seismic image will be denoted a "bandlimited 3D seismic image" or just "bandlimited seismic image". The "term" filter may or may not describe a frequency filter as described in the embodiment above.

Figure 3:
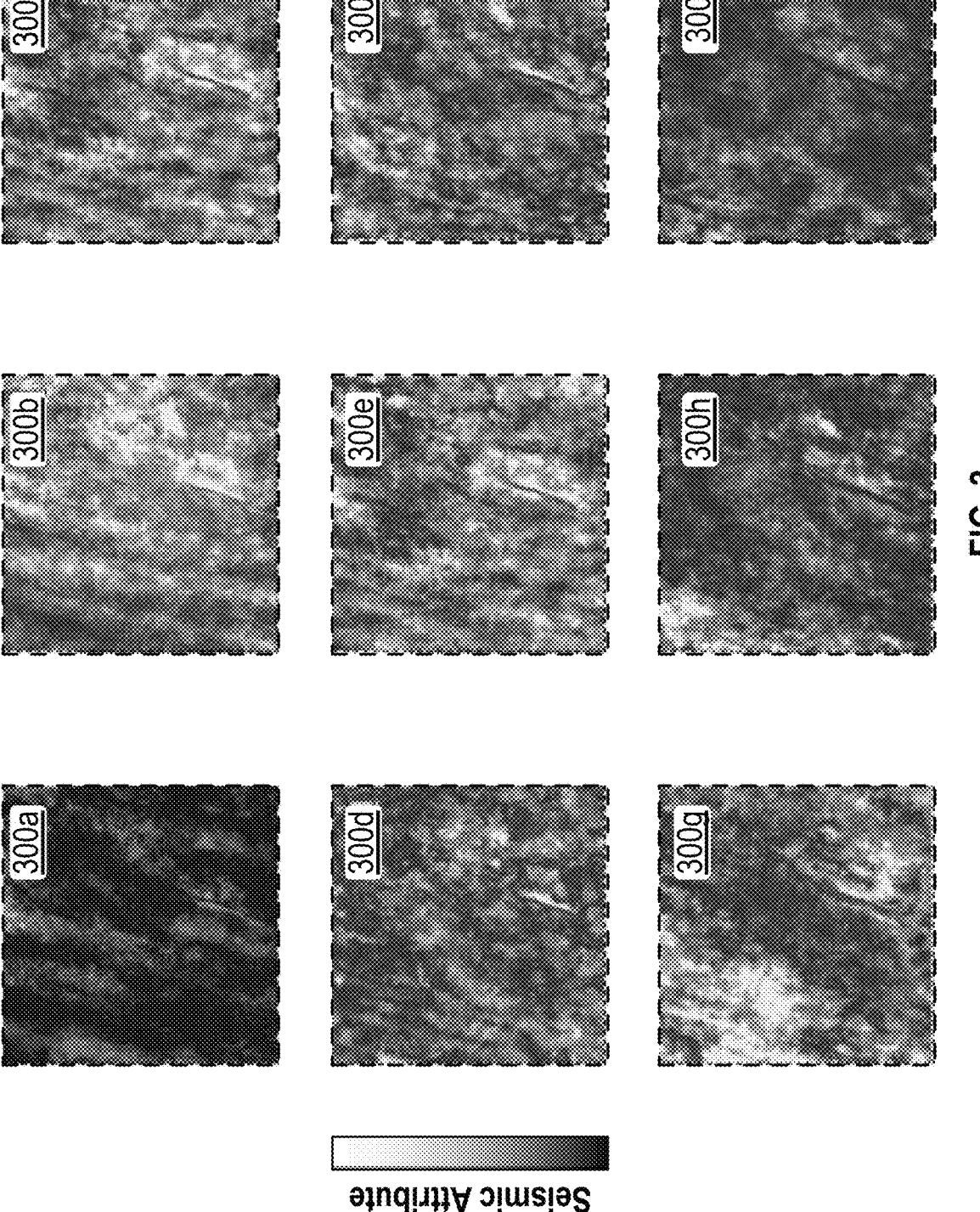
FIG. 3 shows mono-frequency maps in accordance with one or more embodiments.

Seismic attributes may also present as large or bright amplitudes within certain areas of the seismic image (200) when the seismic image (200) is spectrally decomposed. For example, FIG. 3 shows the magnitude of the seismic attribute of amplitude within the seismic image (200) over the horizon (112) when the seismic image (200) is spectrally decomposed into mono-frequency maps (300a-i) of varying frequencies. The mono-frequency maps (300a-i) range from 10 Hz (300a) to 50 Hz (300i) in 5 Hz increments. In this example, spectral decomposition is applied to the seismic image (200) on the horizon (112) using a constrained least-squares spectral analysis to determine the mono-frequency maps (300a-i).

Spectral decomposition of the seismic image (200) may be determined by dividing each trace, or each response of a reflected seismic wave (114), into a plurality of segments using a sliding time-window and transforming each segment from the current domain to the frequency domain. If the seismic image (200) is in the time domain, a mono-frequency map (300a-i) will be spectrally decomposed into the temporal frequency domain. If the seismic image (200) is in the depth domain, a mono-frequency map (300a-i) will be spectrally decomposed into the spatial frequency or wavenumber domain. In other embodiments, spectral decomposition may be performed using a short-time discrete Fourier transform, such as a Gabor transform or S transform, the continuous wavelet transform, or the Wigner distribution function along the time axis or depth axis of the seismic image (200). Other methods of spectrally decomposing the seismic image (200) into mono-frequency maps (300a-i) may be apparent to one skilled in the art. Continuing with the example in FIG. 3, each mono-frequency map (300a-i) displays an amplitude, which is the seismic attribute, at a particular frequency for a range of positions over the horizon (112) of the seismic image (200), where the particular frequency changes for each mono-frequency map (300a-i). For example, mono-frequency map 300a displays the amplitudes for 10 Hz and mono-frequency map 300b displays the amplitudes for 15 Hz.

In accordance with one or more embodiments, machine learning networks may be used to cluster data points into groups of categories. A machine learning network may cluster data points that are data vectors each containing a plurality of values. For example, the machine learning network may cluster data vectors where each value is a value of a seismic attribute displayed on the mono-frequency maps (300a-i). Such a data vector may be denoted l(x,y) where l may indicate each of the nine mono-frequency values and x and y indicate position on the mono-frequency maps (300a-i). Displaying clustering in nine dimensions is challenging. Instead, we illustrate the clustering in two dimensions using only data drawn from mono-frequency map (300a), $A_a(x,y)$, and mono-frequency map (300b), $A_b(x,y)$.

Figure 4:
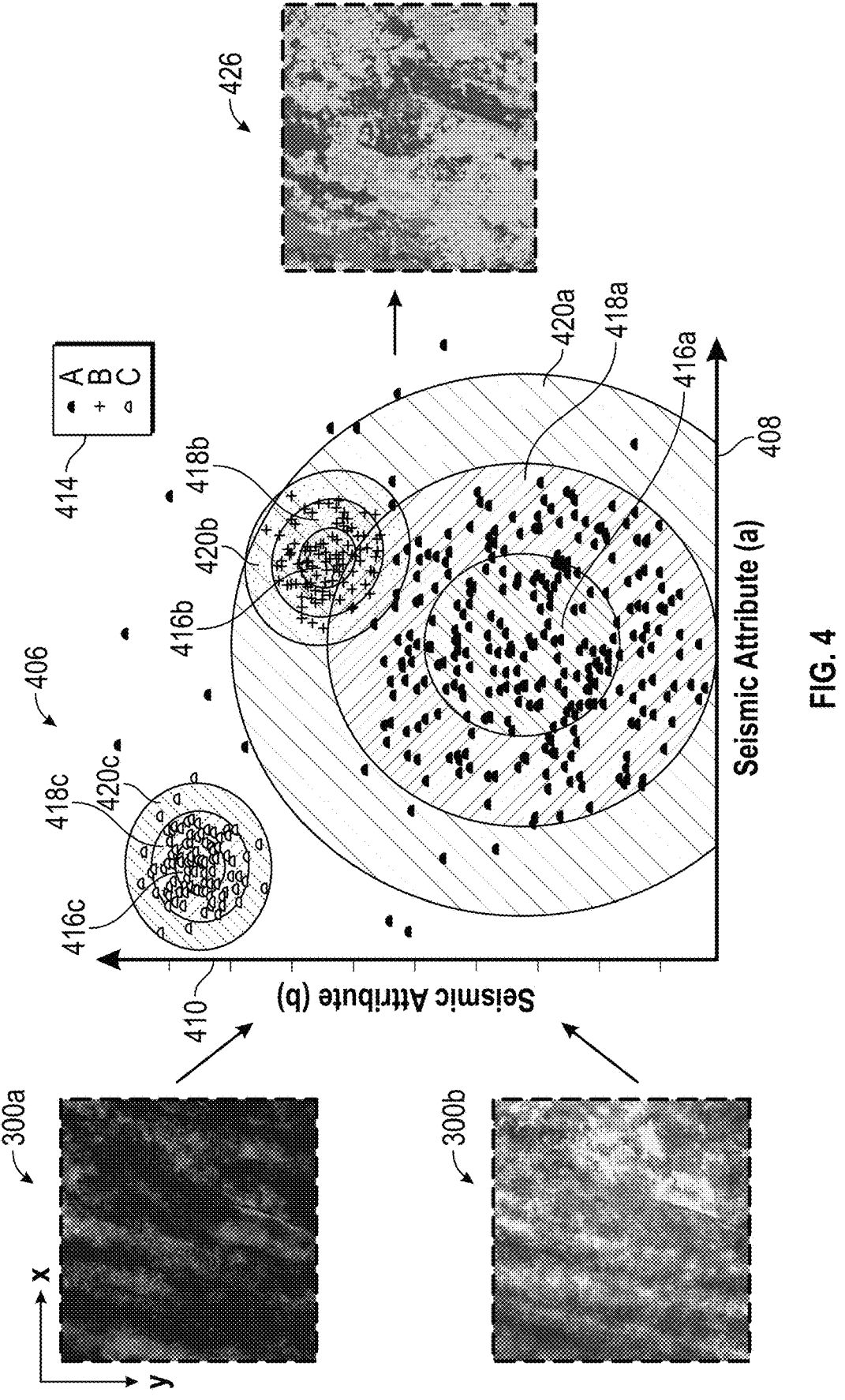
FIG. 4 depicts a machine learning network in accordance with one or more embodiments.

FIG. 4 illustrates clustering in two dimensions using a machine learning network. The inputs into the machine learning network are mono-frequency map (300a), $A_a(x,y)$, and mono-frequency map (300b), $A_b(x,y)$. In this two-dimensional example, each point, x, y, has two values $A_a(x,y)$ and $A_b(x,y)$ associated with it that may be plotted in a two-dimensional display (406) where the abscissa (408) represents the seismic attribute for mono-frequency map (300a) and the ordinate (410) represents the seismic attribute for mono-frequency map (300b). The machine learning network may identify clusters of points in this two-dimensional space (406) that have similar values. In the example shown in FIG. 4, the machine learning network may identify three clusters, but there may be a greater or fewer number and while the number of clusters may often be greater when clustering is performed using higher dimensional datasets, there is no rigid connection between the dimensionality of the dataset and the number of identified clusters.

The machine learning network may use a supervised or an unsupervised approach to cluster or categorize the points $(A_a,A_b)$. An unsupervised approach may not require a pre-defined number of clusters in which the points $(A_a,A_b)$ are categorized. Machine learning networks may use hard clustering models or soft clustering models. Hard clustering models, such as a K-means model, may categorize each point $(A_a,A_b)$ into only one of k categories. Alternatively, soft clustering models, such as Gaussian mixture models, may assign each point $(A_a,A_b)$ to a plurality of clusters with a probability given to each assignment. Display (406) depicts the output of a soft clustering model, in accordance with one or more embodiments. In this example, the points $(A_a,A_b)$ may be clustered into three categories A through C as shown by the key (414) using a continuous probability distribution. For example, points falling within contour (420a) may be assigned a probability greater than 10%, points within contour (418a) a probability greater than 30%, and points within contour (416a) a probability of greater than 60% of belonging to cluster A. Similarly, points falling within contour (420b) may be assigned a probability greater than 10%, points within contour (418b) a probability greater than 30%, and points within contour (416b) a probability of greater than 60% of belonging to cluster B. And again, points falling within contour (420c) may be assigned a probability greater than 10%, points within contour (418c) a probability greater than 30%, and points within contour (416c) a probability of greater than 60% of belonging to cluster C. Points falling within multiple contours may be assigned multiple probabilities. For example, points falling within contour (418a) and contour (420b) may be assigned a probability greater than 30% of belonging in cluster A and a probability greater than 10% of belonging to cluster B.

After the machine learning network has assigned each point to a cluster and/or assigned each point a probability that it belongs to one or more clusters, a seismic attribute map (426) may be generated. In accordance with one or more embodiments, the seismic attribute at each spatial point, (x,y), on the horizon (112) may be assigned a value indicating the cluster in which the corresponding data vector lies. The seismic attribute map (426) may be formed by displaying the cluster value at each spatial point, (x,y).

A person of ordinary skill in the art will readily appreciate that FIG. 4 depicts only one simplified version of the action of the machine learning network. The machine learning network may, for example, use a hard clustering model, such as a K-means model, or a soft clustering model, such as a Gaussian mixture model, without departing form the scope of the invention. Similarly, the machine learning network may accept one or a plurality of seismic attributes for each spatial location without departing from the scope of the invention.

While seismic attributes from a seismic image (200) may provide insight into the spatial variation within the subterranean region (102), minimal information about geological characteristics and petrophysical properties of rock (120) within the subterranean region (102) is gained from the seismic attributes alone. Geological characteristics or rock facies are defined for a body of rock (120) using specified characteristics that can be any observable characteristic of the rock (120) and can be the changes that may occur in those characteristics over a subterranean region (102). Rock facies (from hereinafter also "facies") may include rock color, composition, texture, structure, fossil content, association, and form and may be chemical, physical, or biological in nature. Specifically, rock facies may include, without limitation, rock color, grain size and shape, mineral content, and rock type. Rock facies of one body of rock (120) distinguish it from rock facies of another body of rock (120). Petrophysical properties of rock (120) are defined as physical and chemical properties of rock (120) and the interaction of rock with fluids. Petrophysical properties of rock (120) may include, without limitation, porosity, permeability, saturation, and total carbon content.

Well logs recorded using a well logging system within a wellbore (118) may be used to identify rock facies and petrophysical properties surrounding a wellbore (118). Well logs may be recorded using logging-while-drilling data, wireline data, and/or rock core data. Types of well logs (hereinafter also "logs") include, without limitation, gamma ray, spontaneous potential, resistivity, density, neutron porosity, photoelectricity, temperature, and acoustic information along the depth of a wellbore (118). Interpreted in combination, logs may indicate facies and petrophysical properties. For example, regions of low gamma ray values, high resistivity values, and high neutron porosity values may indicate a high porosity sandstone.

Figure 5:
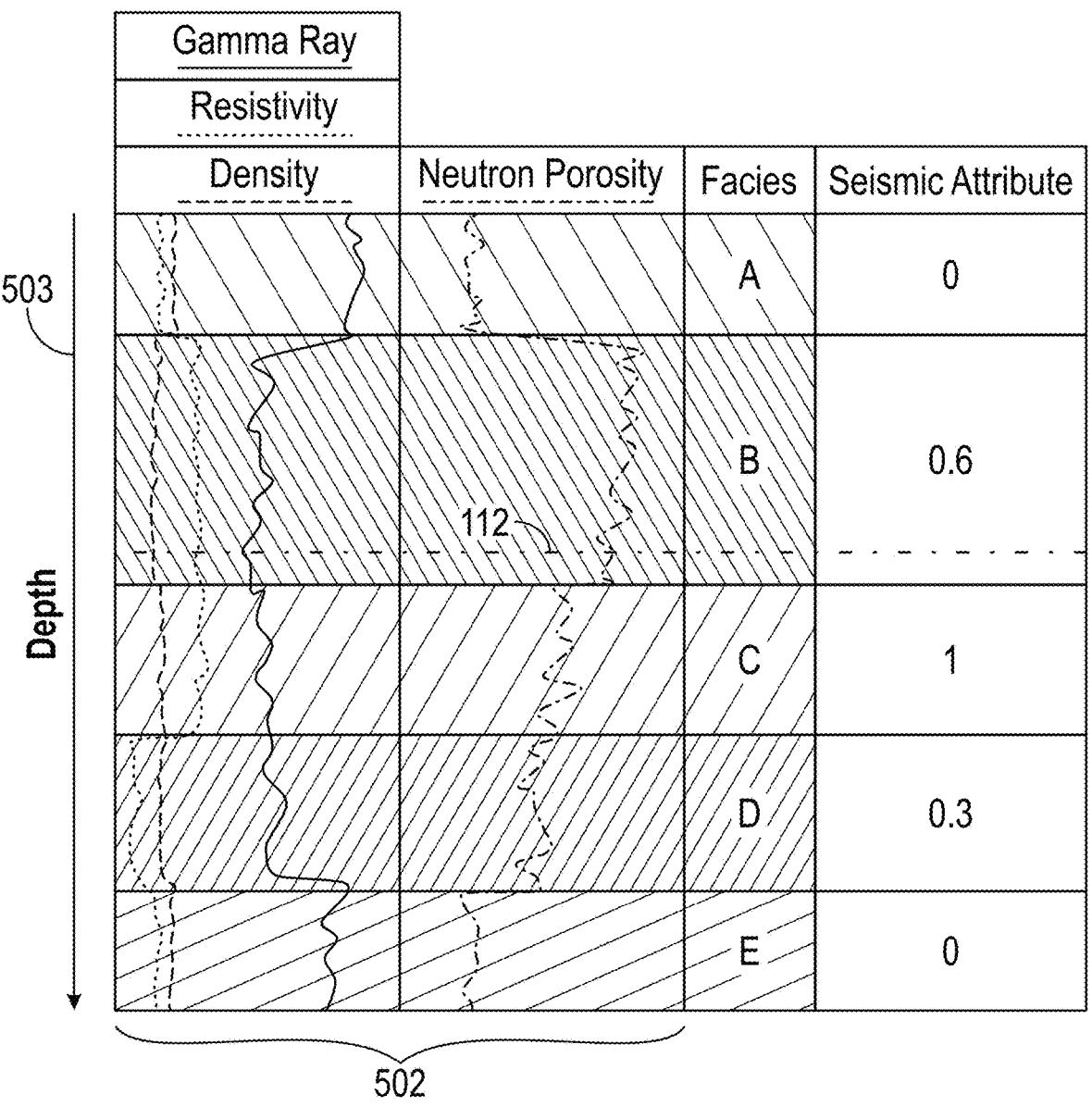
FIG. 5 shows well logs in accordance with one or more embodiments.

FIG. 5 shows four well logs (502) along a portion of the depth of one wellbore (118) where depth is along the ordinate (503), which may intersect a horizon (112). The well logs include a gamma ray log, a resistivity log, and a density log on one track and a neutron porosity log on a second track. The combination of logs may indicate portions of rock facies A through E as shown on a third track. The density log and neutron porosity log may also indicate petrophysical properties, specifically porosity. For example, in FIG. 5, the density log and neutron porosity log may indicate rock facies B through D present highly porous regions. Further to FIG. 5, rock facies B may be identified as being characteristic of a gas deposit (120) and rock facies C may be identified as being characteristic of oil, both of which constitute a hydrocarbon reservoir (104). Further, rock facies A through E and petrophysical properties may be mapped to values of a seismic attribute as shown on a fourth track. In this embodiment, rock facies A and E map to a seismic attribute value of 0, rock facies D map to a seismic attribute value of 0.3, rock facies C maps to a seismic attribute value of 1, and rock facies B maps to a seismic attribute of 0.6.

FIG. 6 shows a method (600) to determine a rock facies map. In Step 602, a 3D seismic image (200) of a subterranean region (102) may be obtained. A seismic acquisition system records seismic data that is then processed to determine a seismic image (200).

In Step 604, a plurality of well logs (502) recorded in each of a plurality of wellbores (118) with the subterranean region (102) are obtained using a well logging system. One embodiment of a plurality of well logs (502) is depicted in FIG. 5 for one wellbore (118). The same plurality of well logs (502) or a different plurality of well logs (502) may be obtained for other wellbores (118) within the plurality of wellbores (118).

In Step 606, a horizon (112) within the subterranean region (102) is identified on the seismic image (200). The horizon (112) or a portion of the horizon (112) may physically represent a subterranean boundary (112) within the subterranean region (102) and may manifest as a large or bright amplitude within the seismic image (200).

In Step 608, a set of bandlimited 3D seismic images of the subterranean region (102) is determined by applying at least one filter to the seismic image (200). Filters include a bandpass filter, a high-pass filter, a low-pass filter, a band-stop filter, a notch filter, and a Fourier transform. In one embodiment, filters may be designed based, at least in part, on the frequency spectrum within the seismic image (200). However, the term "filter" may or may not describe a frequency filter. The filters selected, the designs of the filters, and the number of bandlimited seismic images within the set of bandlimited seismic images should in no way limit the scope of the invention presented herein.

In Step 610, a set of mono-frequency maps (300a-i) of the horizon (112) is determined by applying spectral decomposition to the seismic image (200). The mono-frequencies selected to determine the set of mono-frequency maps (300a-i) may be based, at least in part, on a spectrum of the 3D seismic image (200). For example, FIG. 2B shows one embodiment of a frequency spectrum (202) of a 3D seismic image (200) where the mono-frequencies (214) are shown to be equally spaced over the majority of the spectrum (202). Further, the number of mono-frequency maps (300a-i) within the set of mono-frequency maps (300a-i) may be based, at least in part, on the bandlimited seismic images. For example, if high frequency bandlimited seismic images present large or bright seismic attributes of interest, the set of mono-frequency maps (300a-i) may include a larger number of high frequency mono-frequency maps relative to the number of low frequency mono-frequency maps. Spectral decomposition may be applied to the seismic image (200) using a constrained least-squares spectral analysis, a short-time discrete Fourier transform, such as a Gabor transform or S transform, the continuous wavelet transform, or the Wigner distribution function. The transform selected for spectral decomposition should in no way limit the scope of the invention presented herein.

Following spectral decomposition, in one embodiment, each mono-frequency map (300a-i) may include an amplitude at a particular frequency for a range of positions over the horizon (112) of the seismic image (200). In other embodiments, each mono-frequency map (300a-i) may represent an average amplitude over a narrow window of frequencies. The seismic attribute or any combination of seismic attributes that spectral decomposition presents should in no way limit the scope of the invention described herein.

In Step 612, a seismic attribute map (426) of the horizon (112) is determined by inputting the set of mono-frequency maps (300*a-i*) into a machine learning network as described previously in FIG. 4. The model of the machine learning network clusters seismic attributes within the set of mono-frequency maps (300*a-i*) and assigns a value of the seismic attribute to each cluster to determine a seismic attribute map (426).

In Step 614, a set of rock facies and/or petrophysical properties are identified using, at least in part, the plurality of well logs (502) recorded in each of a plurality of wellbores (118) and the set of bandlimited 3D seismic images. In one embodiment, rock facies A through E identified in FIG. 5 for one wellbore (118) may be a portion of the set of rock facies and the remaining portion of the set of rock facies may be rock facies F through J for a second wellbore (118) and the rock facies K through N for a third wellbore. In other embodiments, rock facies of one wellbore (118) may be the same or a subset of the rock facies of the second and/or third wellbores (118). For example, rock facies A through E identified in FIG. 5 for one wellbore (118) may also be the rock facies identified for the second and/or third wellbores (118). Further to the embodiment in FIG. 5, rock facies A and E identified from the plurality of well logs (502) may also be identified in low frequency bandlimited seismic images while rock facies B through D identified from the plurality of well logs (502) may also be identified in high frequency bandlimited seismic images. The number of rock facies and petrophysical properties per wellbore (118), the types of rock facies and petrophysical properties per wellbore (118), and the number of wellbores (118) and bandlimited seismic images used to identify the set of rock facies should in no way limit the scope of the invention presented herein.

In Step 616, a transformation function is determined that maps a subset of rock facies to the values of the seismic attributes within the seismic attribute map (426). In one embodiment, the subset of rock facies is the intersection of the set of rock facies with the horizon (112) as depicted for one wellbore (118) in FIG. 5. In another embodiment, the subset of rock facies is the intersection of the set of rock facies with a plurality of horizons (112). The transformation function may map the rock facies of rock type to the seismic attribute of amplitude. In another embodiment, the transformation function may map petrophysical properties, such as porosity, to the seismic attribute of amplitude. However, other rock facies and petrophysical properties may be mapped to other seismic attributes using a transformation function. The rock facies, petrophysical properties, and seismic attribute to be mapped by a transformation function should in no way limit the scope of the invention presented herein.

In Step 618, a rock facies map of the horizon (112) is determined by applying the transformation function to the seismic attribute map (426). FIG. 7 shows one embodiment of a rock facies map (700) where the subset of rock facies includes C, B, J, L, and E as shown by the key (702). In one or more embodiments, variability in the petrophysical property of porosity may be associated with facies C, B, J, L, and E. The rock facies map (700) may be used to identify highly porous regions within the subterranean region (102), which may be, at least in part, characteristic of a hydrocarbon reservoir (104).

Figure 8:
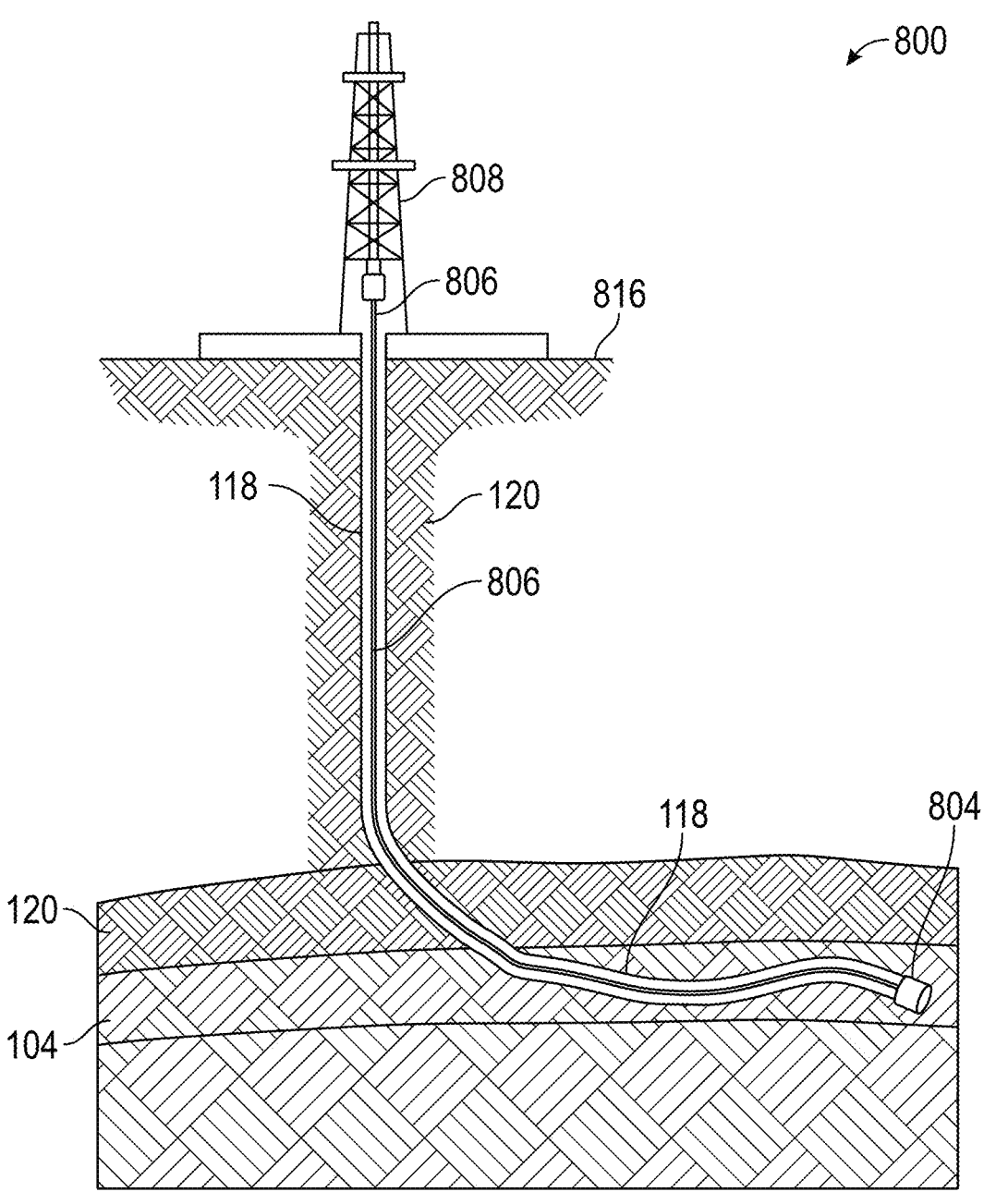
FIG. 8 shows a wellbore in accordance with one or more embodiments.

FIG. 8 illustrates a drill system (800) that may be used to drill a wellbore (118) in the subterranean region (102) following identification of a hydrocarbon reservoir (104) or a productive portion of a hydrocarbon reservoir (104) using, at least in part, the rock facies map (700). For example, in FIG. 7, productive portions of a hydrocarbon reservoir (104) may be indicated on the facies map (700) by facies C and B. The wellbore (118) may be drilled to access the hydrocarbon reservoir (104) using a drill bit (804) attached to a drillstring (806) further attached to a drill rig (808), where the drill rig (808) is located on the surface of the Earth (816). The wellbore (118) may traverse subterranean boundaries (112) between rock (120) before reaching the hydrocarbon reservoir (104). By applying the method (600) presented in FIG. 6, confidence may be gained that the most prolific portions of the identified hydrocarbon reservoir (104) are drilled.

Figure 9:
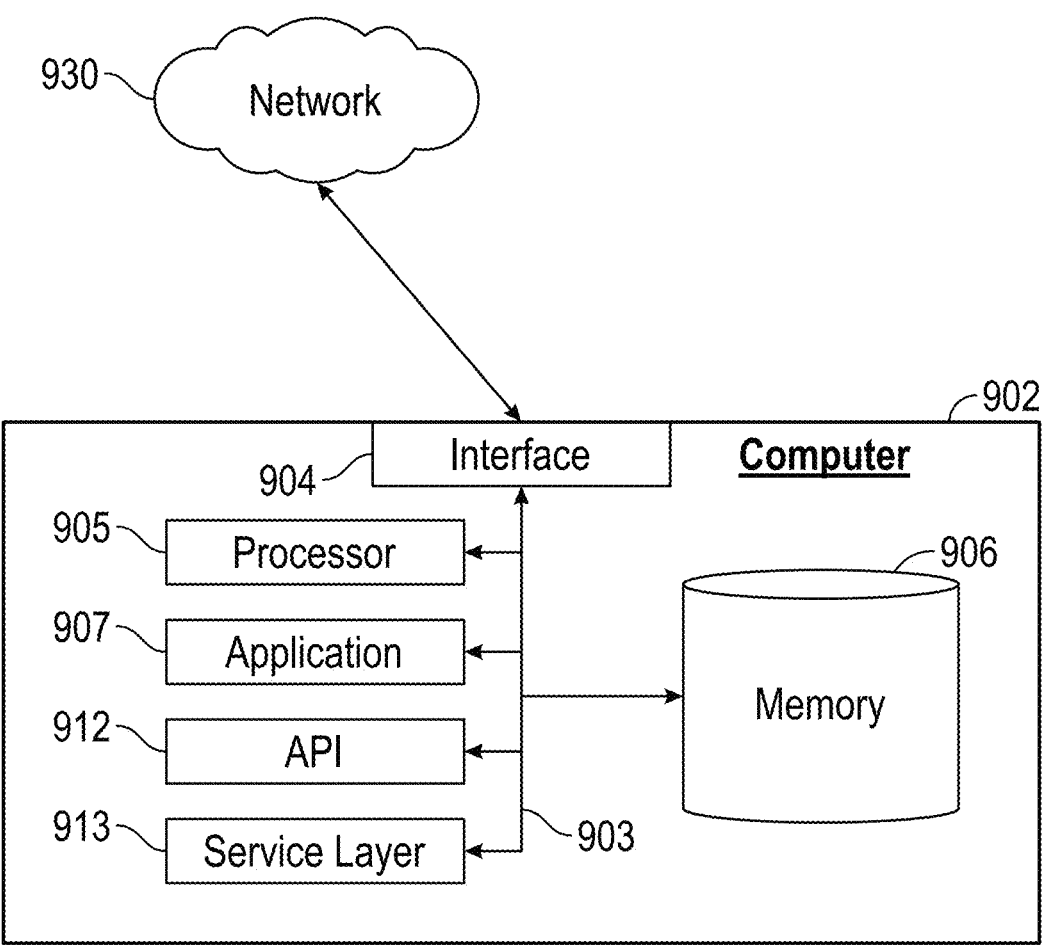
FIG. 9 depicts a computer system in accordance with one or more embodiments.

FIG. 9 depicts a block diagram of a computer system (902) used to provide computational functionalities associated with described machine learning networks, algorithms, methods, functions, processes, flows, and procedures as described in this disclosure, according to one or more embodiments. The illustrated computer (902) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (902) may include a computer that includes an input device, such as a keypad, keyboard, touch screen, or other device that can accept user information, and an output device that conveys information associated with the operation of the computer (902), including digital data, visual, or audio information (or a combination of information), or a GUI.

The computer (902) can serve in a role as a client, network component, a server, a database or other persistency, or any other component (or a combination of roles) of a computer system for performing the subject matter described in the instant disclosure. The illustrated computer (902) is communicably coupled with a network (930). In some implementations, one or more components of the computer (902) may be configured to operate within environments, including cloud-computing-based, local, global, or other environment (or a combination of environments).

At a high level, the computer (902) is an electronic computing device operable to receive, transmit, process, store, or manage data and information associated with the described subject matter. According to some implementations, the computer (902) may also include or be communicably coupled with an application server, e-mail server, web server, caching server, streaming data server, business intelligence (BI) server, or other server (or a combination of servers).

The computer (902) can receive requests over network (930) from a client application (for example, executing on another computer (902)) and responding to the received requests by processing the said requests in an appropriate software application. In addition, requests may also be sent to the computer (902) from internal users (for example, from a command console or by other appropriate access method), external or third-parties, other automated applications, as well as any other appropriate entities, individuals, systems, or computers.

Each of the components of the computer (902) can communicate using a system bus (903). In some implementations, any or all of the components of the computer (902), both hardware or software (or a combination of hardware and software), may interface with each other or the interface (904) (or a combination of both) over the system bus (903) using an application programming interface (API) (912) or a service layer (913) (or a combination of the API (912) and service layer (913). The API (912) may include specifications for routines, data structures, and object classes. The API (912) may be either computer-language independent or dependent and refer to a complete interface, a single function, or even a set of APIs. The service layer (913) provides software services to the computer (902) or other components (whether or not illustrated) that are communicably coupled to the computer (902). The functionality of the computer (902) may be accessible for all service consumers using this service layer. Software services, such as those provided by the service layer (913), provide reusable, defined business functionalities through a defined interface. For example, the interface may be software written in JAVA, C++, or other suitable language providing data in extensible markup language (XML) format or another suitable format. While illustrated as an integrated component of the computer (902), alternative implementations may illustrate the API (912) or the service layer (913) as stand-alone components in relation to other components of the computer (902) or other components (whether or not illustrated) that are communicably coupled to the computer (902). Moreover, any or all parts of the API (912) or the service layer (913) may be implemented as child or sub-modules of another software module, enterprise application, or hardware module without departing from the scope of this disclosure.

The computer (902) includes an interface (904). Although illustrated as a single interface (904) in FIG. 9, two or more interfaces (904) may be used according to particular needs, desires, or particular implementations of the computer (902). The interface (904) is used by the computer (902) for communicating with other systems in a distributed environment that are connected to the network (930). Generally, the interface (904) includes logic encoded in software or hardware (or a combination of software and hardware) and operable to communicate with the network (930). More specifically, the interface (904) may include software supporting one or more communication protocols associated with communications such that the network (930) or interface's hardware is operable to communicate physical signals within and outside of the illustrated computer (902).

The computer (902) includes at least one computer processor (905). Although illustrated as a single computer processor (905) in FIG. 9, two or more processors may be used according to particular needs, desires, or particular implementations of the computer (902). Generally, the computer processor (905) executes instructions and manipulates data to perform the operations of the computer (902) and any machine learning networks, algorithms, methods, functions, processes, flows, and procedures as described in the instant disclosure.

The computer (902) also includes a memory (906) that holds data for the computer (902) or other components (or a combination of both) that can be connected to the network (930). For example, memory (906) can be a database storing data consistent with this disclosure. Although illustrated as a single memory (906) in FIG. 9, two or more memories may be used according to particular needs, desires, or particular implementations of the computer (902) and the described functionality. While memory (906) is illustrated as an integral component of the computer (902), in alternative implementations, memory (906) can be external to the computer (902).

The application (907) is an algorithmic software engine providing functionality according to particular needs, desires, or particular implementations of the computer (902), particularly with respect to functionality described in this disclosure. For example, application (907) can serve as one or more components, modules, applications, etc. Further, although illustrated as a single application (907), the application (907) may be implemented as multiple applications (907) on the computer (902). In addition, although illustrated as integral to the computer (902), in alternative implementations, the application (907) can be external to the computer (902).

There may be any number of computers (902) associated with, or external to, a computer system containing a computer (902), wherein each computer (902) communicates over network (930). Further, the term "client," "user," and other appropriate terminology may be used interchangeably as appropriate without departing from the scope of this disclosure. Moreover, this disclosure contemplates that many users may use one computer (902), or that one user may use multiple computers (902).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method of determining a rock facies map comprising:
   obtaining a three-dimensional (3D) seismic image of a subterranean region;
   obtaining a plurality of well logs recorded in each of a plurality of wellbores within the subterranean region;
   identifying a horizon within the subterranean region on the 3D seismic image;
   determining a set of bandlimited 3D seismic images of the subterranean region by applying a filter to the 3D seismic image;
   determining a set of mono-frequency maps of the horizon by applying spectral decomposition to the 3D seismic image, wherein a frequency of each mono-frequency map is selected based, at least in part, on a spectrum of the 3D seismic image and the set of bandlimited 3D seismic images;
   determining a seismic attribute map of the horizon based, at least in part, on the set of mono-frequency maps and a machine learning network;
   identifying a set of rock facies based, at least in part, on the plurality of well logs recorded in each of the plurality of wellbores and the set of bandlimited 3D seismic images;
   determining a transformation function that maps a subset of rock facies to values of the seismic attribute map;
   determining the rock facies map of the horizon based, at least in part, on the seismic attribute map and the transformation function;

identifying a hydrocarbon reservoir within the subterranean region based, at least in part, on the rock facies map; and planning and drilling a wellbore within the subterranean region to recover the hydrocarbon reservoir.

2. The method of claim 1, wherein the 3D seismic image comprises a time migrated image.

3. The method of claim 1, wherein the plurality of well logs comprises at least one of a gamma ray log, a resistivity log, and a density log.

4. The method of claim 1, wherein a transform for spectral decomposition comprises a constrained least-squares spectral analysis.

5. The method of claim 1, wherein the machine learning network comprises an unsupervised variational Bayesian Gaussian mixture model.

6. The method of claim 1, wherein the set of rock facies comprises a high porosity sandstone.

7. The method of claim 1, wherein the subset of rock facies comprises an intersection of the set of rock facies and the horizon.

8. A system comprising:

a seismic acquisition system;

a well logging system;

a computer system configured to:

receive a three-dimensional (3D) seismic image of a subterranean region using the seismic acquisition system, receive a plurality of well logs recorded in each of a plurality of wellbores within the subterranean region using the well logging system, identify a horizon within the subterranean region on the 3D seismic image, determine a set of bandlimited 3D seismic images of the subterranean region by applying a filter to the 3D seismic image, determine a set of mono-frequency maps of the horizon by applying spectral decomposition to the 3D seismic image, wherein a frequency of each mono-frequency map is selected based, at least in part, on a spectrum of the 3D seismic image and the set of bandlimited 3D seismic images, determine a seismic attribute map of the horizon based, at least in part, on the set of mono-frequency maps and a machine learning network, identify a set of rock facies based, at least in part, on the plurality of well logs recorded in each of the plurality of wellbores and the set of bandlimited 3D seismic images, determine a transformation function that maps a subset of rock facies to values of the seismic attribute map, determine a rock facies map of the horizon based, at least in part, on the seismic attribute map and the transformation function, identify a hydrocarbon reservoir within the subterranean region based, at least in part, on the rock facies map, and plan a wellbore within the subterranean region to recover the hydrocarbon reservoir; and a drill system configured to drill the wellbore within the subterranean region to recover the hydrocarbon reservoir.

9. The system of claim 8, wherein the 3D seismic image comprises a time migrated image.

10. The system of claim 8, wherein the plurality of well logs comprises at least one of a gamma ray log, a resistivity log, and a density log.

11. The system of claim 8, wherein a transform for spectral decomposition comprises a constrained least squares spectra analysis.

12. The system of claim 8, wherein the machine learning network comprises an unsupervised variational Bayesian Gaussian mixture model.

* * * * *